(12) United States Patent
Ananda et al.

(10) Patent No.: US 9,547,612 B2
(45) Date of Patent: Jan. 17, 2017

(54) METHOD AND ARCHITECTURE FOR DATA CHANNEL VIRTUALIZATION IN AN EMBEDDED SYSTEM

(71) Applicant: ITTIAM SYSTEMS (P) LTD., Bangalore (IN)

(72) Inventors: Ranjith Kagathi Ananda, Bangalore (IN); Prashanth Dixit Subramanya, Bangalore (IN); Darshandatt Shivadatta Kikkeri, Bangalore (IN); Swapan Kumar Kundu, Bangalore (IN); Rajendra Chandrashekhar Turakani, Bangalore (IN)

(73) Assignee: ITTIAM SYSTEMS (P) LTD., Bangalore, Karnataka (IN)

( * ) Notice: Subject to any disclaimer, the term of this patent is extended or adjusted under 35 U.S.C. 154(b) by 604 days.

(21) Appl. No.: 13/888,399

(22) Filed: May 7, 2013

(65) Prior Publication Data

US 2014/0337860 A1    Nov. 13, 2014

(51) Int. Cl.
*G06F 3/00* (2006.01)
*G06F 13/38* (2006.01)

(52) U.S. Cl.
CPC .................. *G06F 13/385* (2013.01)

(58) Field of Classification Search
CPC ........................................................ G06F 9/54
USPC .............................................................. 710/8
See application file for complete search history.

(56) References Cited

U.S. PATENT DOCUMENTS

2004/0181594 A1* 9/2004 Suleiman ............... H04L 69/329
709/225
2014/0181809 A1* 6/2014 Lvovsky ............. G06F 9/45558
718/1

\* cited by examiner

*Primary Examiner* — Chun-Kuan Lee
(74) *Attorney, Agent, or Firm* — Prakash Nama; Global IP Services, PLLC

(57) ABSTRACT

A method for providing data channel virtualization between one or more devices and one or more applications is disclosed. In one example, a device policy manager (DPM) is initialized by creating an instance of the DPM before creating any application. Further, the DPM is configured for device management by identifying each device of the one or more devices and its associated device data channel (DDC) to be managed by the DPM. Each of the one or more devices is identified using an associated device identity (ID) and its corresponding DDC. Furthermore, one or more virtual data channels (VDCs) are created and provided to the one or more associated applications upon receiving a request from each of the one or more applications using a device identity (ID) and any application specific configuration parameters provided by the application.

23 Claims, 5 Drawing Sheets

METHOD AND ARCHITECTURE FOR DATA CHANNEL VIRTUALIZATION IN AN EMBEDDED SYSTEM

TECHNICAL FIELD

Embodiments of the present subject matter relate to an embedded system. More particularly, embodiments of the present subject matter relate to interfacing devices with application programs in the embedded system.

BACKGROUND

With increase in processing capabilities of embedded processors over the years, the functionality of embedded systems is getting increasingly complex. Often audio/video data originating from one or more devices need to be processed differently by different application programs. Similarly, the audio/video data produced by different application programs need to be played out/rendered on one or more output devices.

For example, the application programs may need to transform input audio/video data coming from one device (e.g., a camera, a personal computer (PC), a microphone and the like) in multiple ways. For example, a video captured from a single high definition camera might have to undergo a low bit rate and low frame rate encoding for a live streaming application and a high bit rate high frame rate encoding for a recording application. Also, data captured from a network socket might need to be processed by different application programs in different ways. For example, a recorder and a transcoder working on single input stream.

Further, the application programs may need to render/play out video/audio data coming from multiple devices on to a single output device (for example, a liquid crystal display (LCD) device, a personal computer (PC), a speaker, and so on). For example, a video communication application requiring displaying video of all attendees in a multiparty video conference on a single monitor. At the same time, a media player application may have to render presentation content onto same output device. Furthermore, the application programs may need to encode and stream multiple streams of input data. For example, a video surveillance system capturing from an array of cameras, encoding and streaming all input video streams over a network.

Even though the newer processors are capable of processing multiple streams of audio/video data, the number of pins available for audio/video data communication with other devices (e.g., cameras, display controllers and so on) can be a significant constraint as well. This may result in only a single data channel being available for the processor for communicating multiple streams of audio/video data with external devices (e.g., monitors, speakers and so on). In most of these cases, audio/video data corresponding to different channels would have to go through the same set of pins in the processor using time or space division multiplexing schemes.

In addition, majority of existing audio and video device drivers which drive the external device support only one user. They assume single stream of data communication through the data channel. However, they may be ignorant of the underlying data. Most of the existing embedded application programs interact directly with these device drivers to transfer single stream of data through the device data channel (DDC).

Moreover, it can be difficult to manage a single DDC when more than one application needs to access the DDC without being aware of the presence of any other application. Further, it may be difficult to maintain a same level of performance and flexibility of the use of the DDC when there is only a single application.

Existing solutions are not independent of underlying platforms. Furthermore, existing solutions when sharing device input/output (I/O) buffers across many applications may result in access conflicts or deadlocks requiring specialized buffer management.

Moreover, simulating same/different virtual channel properties (VCPs) (for example, video properties, audio properties and system properties, such as resolution for video and sampling frequency for audio) to multiple application programs may be difficult using existing solutions. In addition, it may be difficult to achieve a reduced central processing unit (CPU) and memory utilization needs for the DDC management operation and any additions to processing latency when using existing solutions.

BRIEF DESCRIPTION OF THE DRAWINGS

Various embodiments are described herein with reference to the drawings, wherein.

The architecture, systems and methods disclosed herein may be implemented in any means for achieving various aspects. Other features will be apparent from the accompanying drawings and from the detailed description that follow.

DETAILED DESCRIPTION

A method and an architecture for data channel virtualization in an embedded system are disclosed. In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

The terms "application" and "application program" are used interchangeably throughout the document. The terms "device drivers" and "device data channels (DDCs)" are used interchangeably throughout the document.

Figure 1:
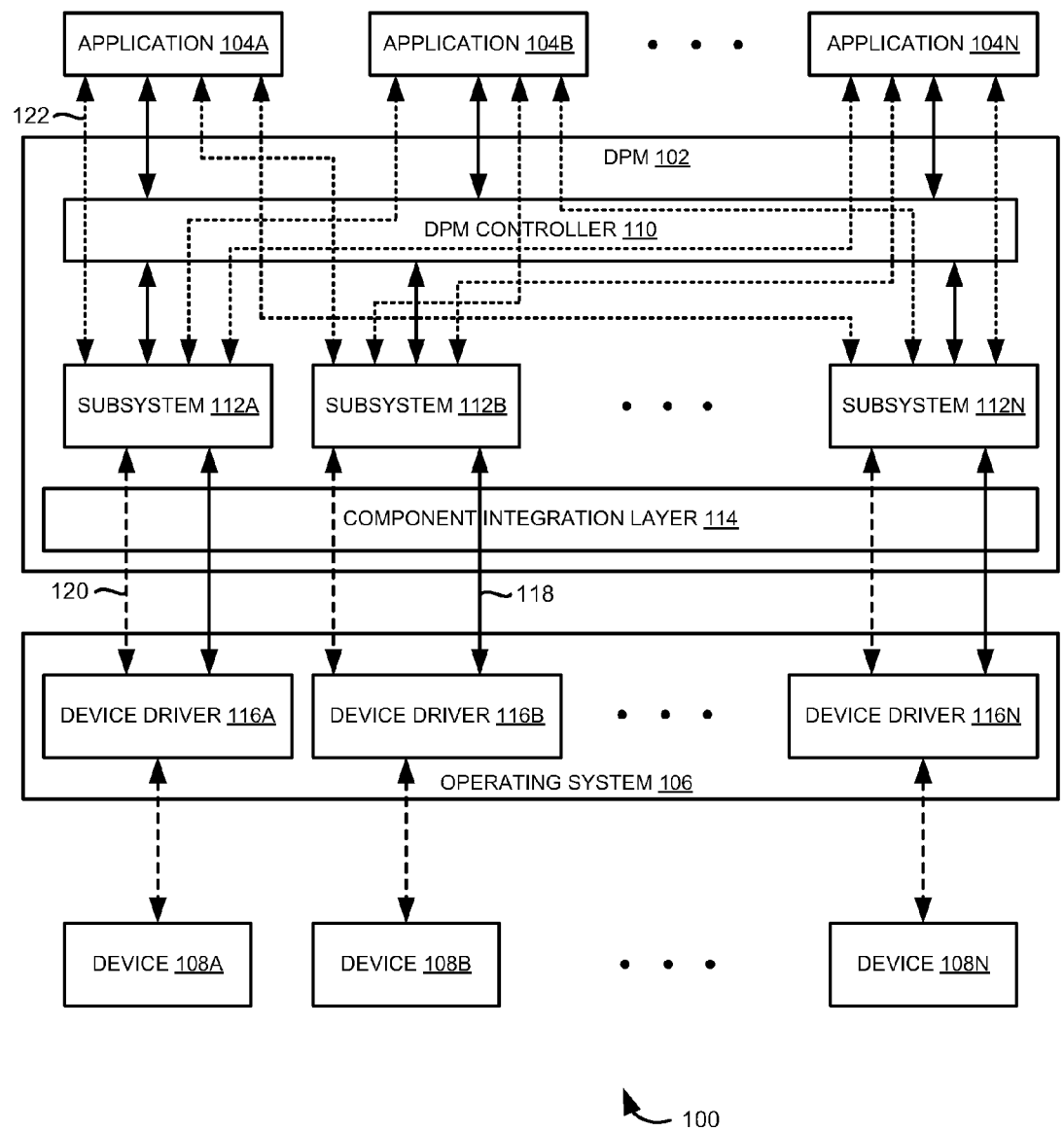
FIG. 1 illustrates major components of an architecture for data channel virtualization in an embedded system, and their interconnectivity, according to one embodiment.

FIG. 1 illustrates major components of an architecture 100 for data channel virtualization in an embedded system, and their interconnectivity, according to one embodiment. As shown in FIG. 1, the architecture 100 includes a device policy manager (DPM) 102, one or more applications 104A-N, an operating system (OS) 106, and one or more devices 108A-N. For example, the devices 108A-N includes a camera, a display, and the like. In one embodiment, the architecture 100 is also used for virtualization of software entities, such as a network socket, a codec and the like. Further, the DPM 102 includes a DPM controller 110, one or more subsystems 112A-N and a component integration layer 114. Furthermore, the OS 106 includes one or more device drivers 116A-N. Moreover, the applications 104A-N access the devices 108A-N through the DPM 102. Also, DPM 102 is interacted with the devices 108A-N via the device drivers 116A-N.

In operation, the DPM 102 provides seamless access to the devices 108A-N using one or more device data channels (DDCs) 116A-N from the applications 104A-N simultaneously. Further, the DPM 102 provides one or more virtual data channels (VDCs) to the applications 104A-N, respectively, such that each of the applications 104A-N accesses its VDC. Furthermore, the DPM 102 defines integration rules to follow for the applications 104A-N accessing the devices 108A-N simultaneously through the DPM 102. In one example, the DPM 102 allows each of the applications 104A-N to configure virtual channel properties (VCPs) that define expected data input/output for the application on its VDC and further provides configurability to select each of the VDCs to contribute to the eventual output of the DDC. For example, the VCPs include video properties, such as a resolution for video streams and the like, audio properties, such as a sampling frequency for audio streams and the like, system properties and the like. For example, the system properties include a number of buffers, buffer dimensions, queue lengths and the like. In addition, the DPM 102 enables the architecture for achieving the simultaneous access to the devices 108A-N by the applications 104A-N. Particularly, the component integration layer 114 provides platform agnostic access to the devices 108A-N via the associated DDCs 116A-N. In case of the software entities, the component integration layer 114 access the software entities through its application programming interfaces (APIs).

In one embodiment, the DPM controller 110 maintains mapping information between each of the one or more VDCs and its associated one of the DDCs 116A-N and updates the mapping information dynamically upon addition or deletion of a VDC of the VDCs. In one example, the DPM controller 110 is the single point contact for the applications 104A-N to access the DPM 102. The DPM controller 110 maintains the mapping information between each of the VDCs and the associated one of the DDCs 116A-N and device identities (IDs). Further, the DPM controller routes data associated with the one or more VDCs to the associated subsystems 112A-N based on the mapping information. For example, lines 122 indicate data transfer between the applications 104A-N and the subsystems 112A-N via the VDCs.

Furthermore, the subsystems 112A-N manage the DDCs 116A-N associated with the devices 108A-N. For example, the lines 120 indicates data transfer between the devices 108A-N and subsystems 112A-N via the DDCs 116A-N. The lines 118 indicate control and configuration between the applications 104A-N, subsystems 112A-N and device drivers 116A-N. For example, the subsystems 112A-N manage the DDCs 116A-N associated with the devices 108A-N, such as input only devices, output only devices and input/output devices. In one exemplary implementation, each of the subsystems 112A-N manages one of the DDCs 116A-N and provides input data to the applications 104A-N through the associated VDCs. In this implementation, the subsystems 112A-N include a video capture subsystem, an audio capture subsystem and the like. In another exemplary implementation, each of the subsystems 112A-N manages one of the DDCs 116A-N and accepts output data from the applications 104A-N through the associated VDCs. In this implementation, the subsystems 112A-N include a video display subsystem, an audio play out subsystem and the like. In yet another implementation, each of the subsystems 112A-N manages one of the DDC 116A-N used for transforming input data to output data from the applications 104A-N. In this implementation, the output data is to be used by the same application that provided the input data. This is explained in more detail with reference to FIG. 2.

Figure 2:
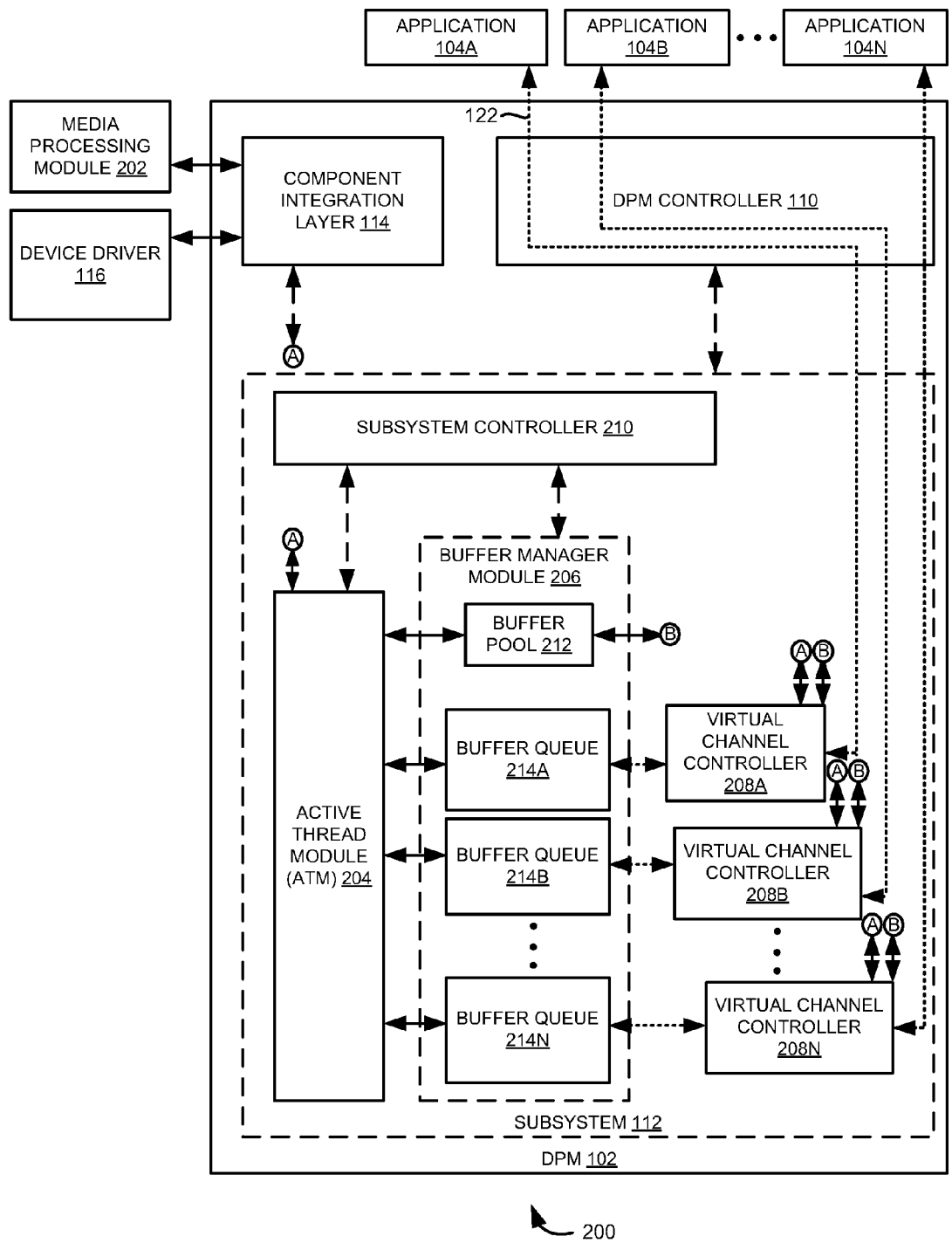
FIG. 2 is a block diagram that illustrates major components of a subsystem, such as the one shown in FIG. 1, and their interconnectivity with the other major components of the architecture, according to one embodiment.

Referring now to FIG. 2, which is a block diagram 200 that illustrates major components of the subsystem 112, such as the one shown in FIG. 1, and their interconnectivity with the other major components of the architecture (e.g., the architecture 100 of FIG. 1), according to one embodiment. The subsystem 112 is one of the subsystems 112A-N. As shown in FIG. 2, the block diagram 200 includes the DPM 102, the applications 104A-N, the device driver 116, and a media processing module 202. For example, the device driver 116 is one of the device drivers 116A-N associated with the subsystem 112. In one example, the device driver 116 is used for data input/output/processing. For example, the media processing module includes a sample rate converter and the like. Further, the DPM 102 includes the DPM controller 110, the subsystem 112, and the component integration layer 114. Furthermore, the subsystem 112 includes an active thread module (ATM) 204, a buffer manager module 206, one or more virtual channel controllers (VCCs) 208A-N and a subsystem controller 210. In addition, the buffer manager module 206 includes a buffer pool 212 and one or more buffer queues 214A-N for the applications 104A-N.

Moreover, the device driver 116 and the media processing module 202 are integrated with DPM 102 through the component integration layer 114. In one example, the media processing module 202 is used for processing media data. Also, the subsystem 112 is coupled to the component integration layer 114 and the DPM controller 110. Particularly, the ATM 204 and the VCCs 208A-N are coupled to the component integration layer 114. Further, the subsystem controller 210 is coupled to the ATM 204 and the buffer manager module 206. Furthermore, the ATM 204 is coupled to the buffer pool 212 and buffer queues 214A-N. In addition, the buffer pool 212 is coupled to the VCCs 208A-N. Moreover, the buffer queues 214A-N are coupled to the VCCs 208A-N, respectively. For example, a number of slots in each of the buffer queues 214A-N is configurable by each of the applications 104A-N.

In operation, the DPM 102 provides seamless access to a device (e.g., one of the devices 108A-N of FIG. 1) using the DDC 116 from the applications 104A-N simultaneously. Further, the DPM 102 provides the VDCs to the applications 104A-N, respectively, such that each of the applications 104A-N accesses its VDC. Furthermore, the DPM 102 defines integration rules to follow for the applications 104A-N accessing the devices 108A-N simultaneously through the DPM 102. In addition, the DPM 102 enables the architecture for achieving the simultaneous access to the device by the applications 104A-N. Particularly, the component integration layer 114 provides platform agnostic access to the device via the associated DDC 116.

In one embodiment, the buffer manager module 206 is responsible for managing buffers across the ATM 204 and VCCs 208A-N and also performs data exchange between the DDC 116 and associated VDCs. For example, the buffers include data buffers and the like. Further, the buffer manager module 206 creates the buffer queues 214A-N for each of the VDCs as well as the buffer pool 212. For example, the buffer queues 214A-N are allocated for each of the VDCs. The number of slots in the each buffer queue and properties of the buffer queue (new buffer overwrite or old buffer overwrite) are configurable by each of the applications 104A-N. In one exemplary implementation, the ATM 204 and VCCs 208A-N interact with the buffer manager module 206 to access buffers required for their operation. The buffer pool 212 at any given instance of time contains all free buffers of the subsystem 112. All buffers used with the subsystem 112 needs to be registered first with the buffer manager module 206. In one example, each of the applications 104A-N pulls the filled buffer from its corresponding queue through VCCs 208A-N and read its content. In another example, the each of the applications 104A-N fills the buffer and pushes the filled buffer to its corresponding queue through the VCCs 208A-N. The buffer manager module 206 tracks buffer usage by the one or more applications 104A-N using a buffer count mechanism.

In one embodiment, the ATM 204 runs its own thread and handles data exchange, in form of buffers, with the DDC 116 and performs data transformation that is common across the VDCs. In one example, each instance of the ATM 204 is responsible for single DDC. The VCCs 208A-N is responsible for independent data transformation required for each of the VDCs. In one example, operation of the ATM 204 is dependent upon the transformations required across the DDC 116 and VDC data. In one exemplary implementation, the ATM 204 captures data from the DDC 116 and pushes the captured data to queues of associated VDCs. In this implementation, a free buffer is obtained by the ATM 204 from the buffer pool 212 and is filled with the data from the DDC 116. When all applications 104A-N release the buffer, the same will be given back to the buffer pool 212. If the data is non-multiplexed data, a buffer including the non-multiplexed data is pushed onto all the queues of the associated VDCs. This mechanism is called data sharing. If the data is time division multiplexed (TDM) data, the buffers based on the device ID are pushed to the queues of the associated VDCs. In this context, the device is the input only device. If the data is space division multiplexed (SDM) data, all the buffers are provided to all the queues of the VDCs, by marking the data location (for example, for video SDM data, by providing stride, dimension and position information) in the buffers to avoid data copy which is resource intensive operation.

In another exemplary implementation, the ATM 204 collates data from all the queues of the VDCs and provides the same to the DDC 116. In one example, a free buffer is obtained by the applications 104A-N from the buffer pool 212 and is filled with valid data. Once the buffer is used by the ATM 204 to render the data to the DDC 116, the same will be given back to the buffer pool 212. For data selection, the data from the queue of a selected VDC of the VDCs is passed onto the DDC 116. For other queues, the ATM 204 empties each queue at a rate configured by the one of the one or more applications 104A-N. In one example, the data from these queues is discarded. This helps to provide rate control to all the applications 104A-N using the DPM 102. For space division multiplexing, for each of the applications 104A-N, the ATM 204 marks out the location in the buffer where the data needs to be written into and the same buffer is provided to multiple applications of the applications 104A-N. This helps avoiding a data copy which is resource intensive. For time division multiplexing, the ATM 204, based on the VDC configuration, pulls the buffer from the queue, adds the device ID to the buffer from the queue and provides the same to the DDC 116. In this context, the devices are the output only devices. For space division multiplexing, for each application, the ATM 204 marks out the data location (for example, for video SDM data, by providing stride, dimension and position information) in the buffer where the data needs to be written into and the same data buffer is provided to multiple applications. This helps avoiding a data copy which is resource intensive.

Further, any processing of the data common across the VDCs is done by the ATM 204 with the help of the component integration layer 114 and the media processing module 202. For example, processing of the data includes sample rate conversion of audio play out (or capture) across the VDCs. Furthermore, the ATM 204 notifies the changes required on data streams (buffers) of each of the VDCs through flags associated with the buffer. The actual data transformation happens in the threads of users of the VDCs. In addition, the VCCs 208A-N controls data exchange between the ATM 204 and the applications 104A-N and performs data transformation for each of the VDCs. Also, the subsystem controller 210 controls the ATM 204, the buffer manager module 206 and the VCCs 208A-N.

Figure 4:
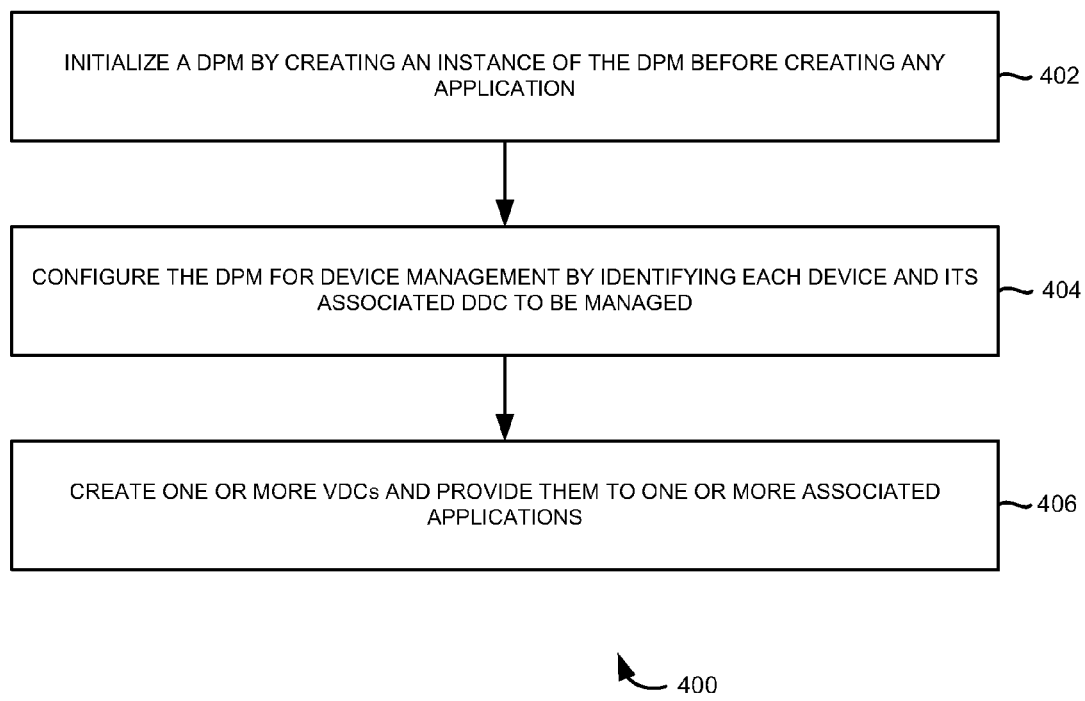
FIG. 4 illustrates a flowchart of a method for providing data channel virtualization in the embedded system, according to one embodiment.

Referring now to FIG. 4, which is a flow chart 400 of a method for providing data channel virtualization in an embedded system, according to one embodiment. At block 402, a DPM is initialized by creating an instance of the DPM before creating any application. In this step, a DPM controller and a component integration layer are created by the DPM 102.

At block 404, the DPM is configured for device management by identifying each device of one or more devices and its associated DDC to be managed. In one embodiment, each device is identified using its device ID and their corresponding DDC. For example, the device ID includes a source identifier or a sink identifier. In this embodiment, the one or more subsystems are created and associated to corresponding DDCs, identified by unique IDs, by the DPM. In one example, a subsystem controller, an ATM, and a buffer manager module including a buffer pool are created by the DPM.

Figure 3:
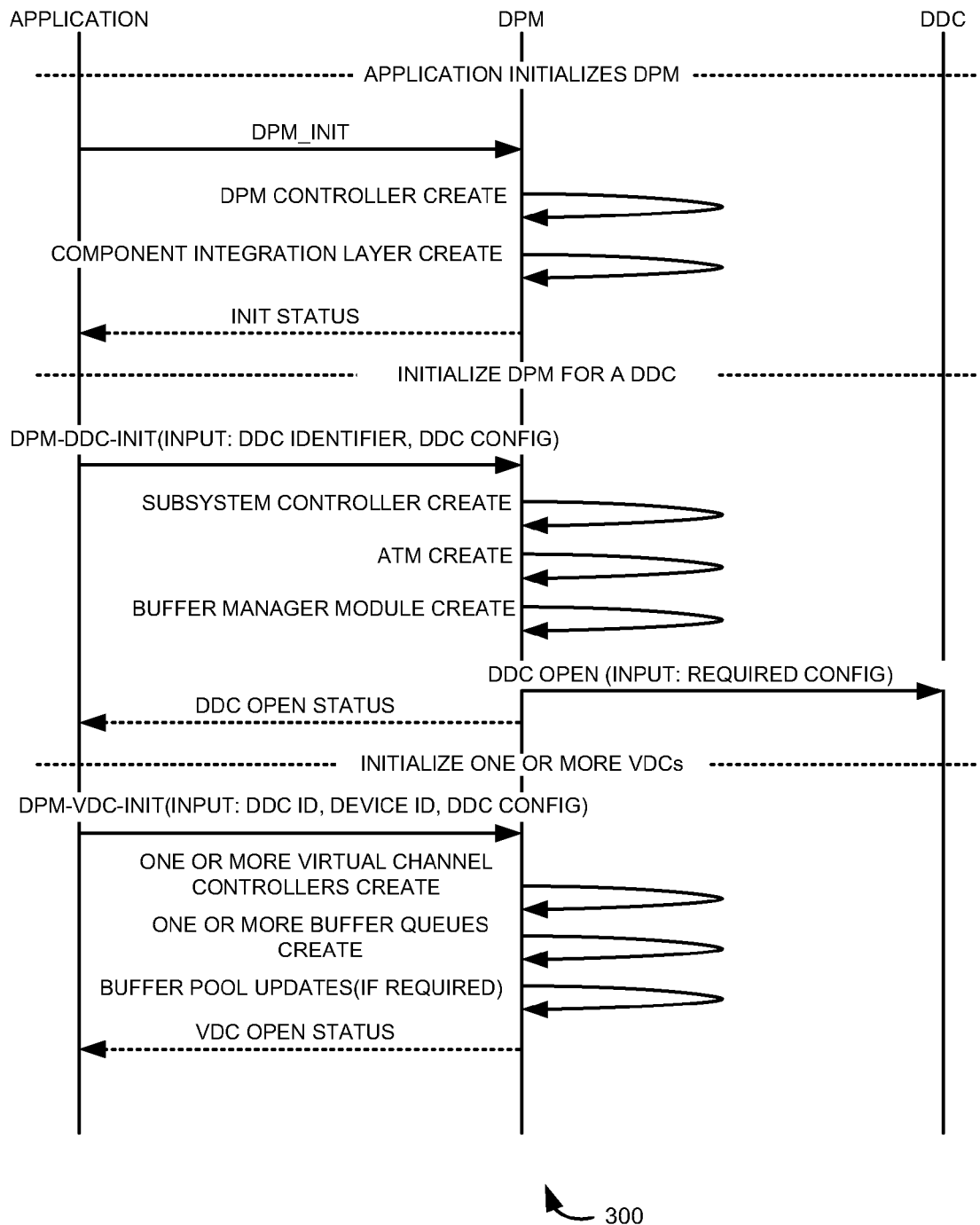
FIG. 3 is a schematic illustrating an initialization sequence of a device policy manager (DPM) when providing the data channel virtualization between one or more devices and one or more application programs, according to one embodiment.

At block 406, one or more VDCs are created and provided them to associated one or more applications upon receiving a request from each of the one or more applications using a device ID and any application specific configuration parameters provided by the application. In one example, the request includes a data channel request. For example, each of the VDCs is identified using associated IDs. In this step, one or more VCCs and one or more buffer queues are created by the DPM (see FIG. 3).

In one embodiment, the DPM controller is created for maintaining mapping information between each of the one or more VDCs and its associated DDC and for updating the mapping information dynamically upon addition or deletion of a VDC. In one example, a mapping table including each of the one or more VDCs and its associated subsystem is formed by the DPM. In this example, an associated subsystem is assigned, by the DPM controller, upon receiving the data channel request on the VDCs from one of the applications. Further in this embodiment, the one or more subsystems are created for managing the one or more DDCs associated with the one or more devices.

In one exemplary implementation, the ATM is created for running its own thread and handling data exchange with the associated DDC and for performing data transformation that is common across the one or more VDCs. Further in this implementation, the one or more VCCs is created for controlling data exchange between the ATM and the one or more applications and for performing independent data transformation for each of the one or more VDCs. Furthermore in this implementation, the buffer manager module is created for performing buffer/queue management between the ATM and the one or more VCCs and for exchanging data between the DDC and associated one or more VDCs. Moreover, a subsystem controller is created for controlling the ATM, the buffer manager module and the one or more VCCs. Furthermore in this embodiment, the component integration layer is created for providing platform agnostic access to the one or more devices via the associated one or more DDCs.

Figure 5:
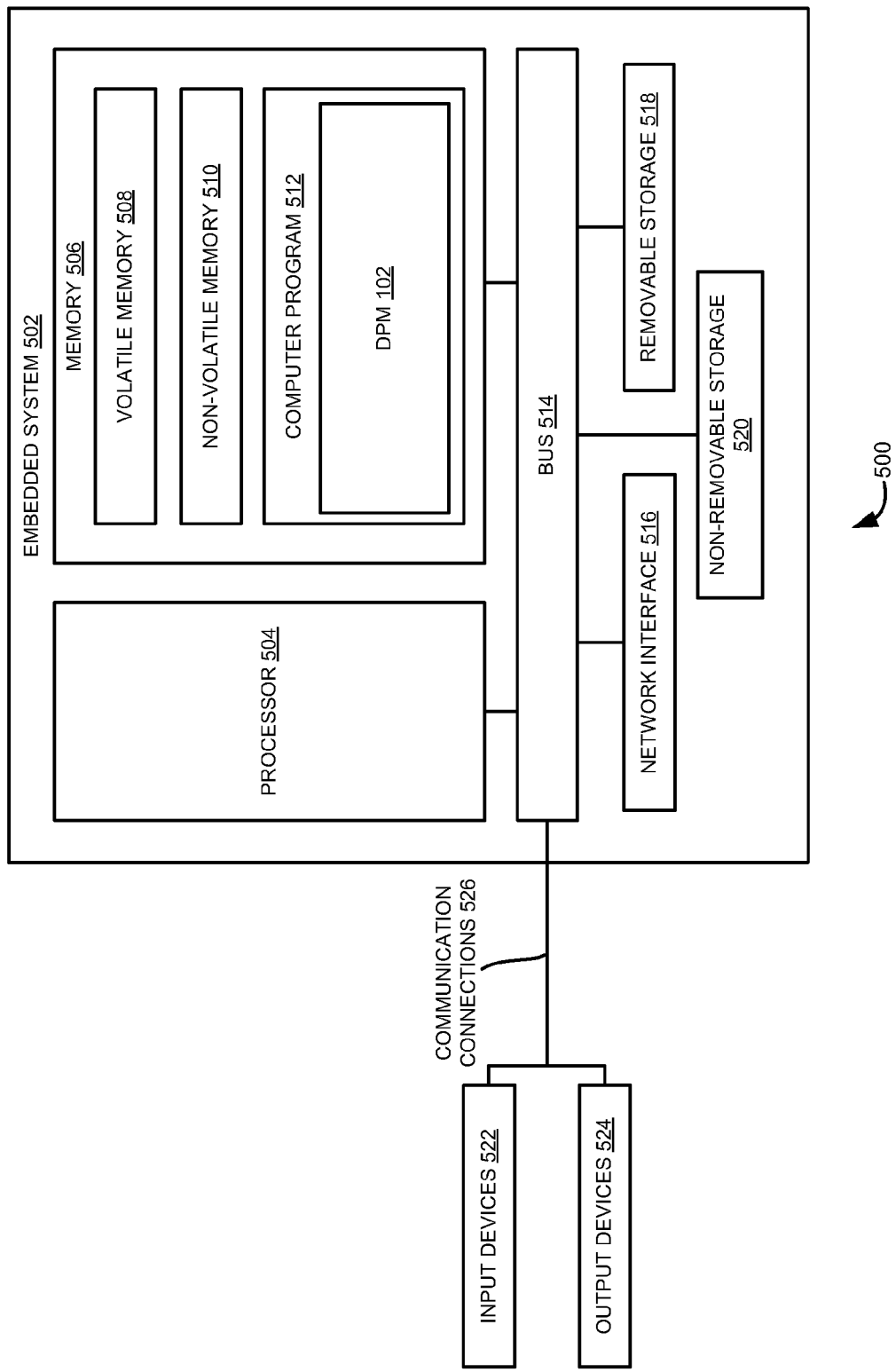
FIG. 5 illustrates the embedded system for providing the data channel virtualization, using the process described in FIG. 4, according to one embodiment.

Referring now to FIG. 5, which illustrates an embedded system 502 for providing data channel virtualization, using the process described in FIG. 4, according to one embodiment. FIG. 5 and the following discussions are intended to provide a brief, general description of a suitable computing environment in which certain embodiments of the inventive concepts contained herein are implemented.

The embedded system 502 includes a processor 504, memory 506, a removable storage 518, and a non-removable storage 520. The embedded system 502 additionally includes a bus 514 and a network interface 516. As shown in FIG. 5, the embedded system 502 includes access to the computing system environment 500 that includes one or more input devices 522, one or more output devices 524, and one or more communication connections 526 such as a network interface card and/or a universal serial bus connection.

Exemplary input devices 522 include a camera, a microphone and the like. Exemplary output devices 524 include a display screen, a speaker and the like. Exemplary communication connections 526 include a local area network, a wide area network, and/or other network.

The memory 506 further includes volatile memory 508 and non-volatile memory 510. A variety of computer-readable storage media are stored in and accessed from the memory elements of the embedded system 502, such as the volatile memory 508 and the non-volatile memory 510, the removable storage 518 and the non-removable storage 520. The memory elements include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processor 504, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 504 also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 504 of the embedded system 502. For example, a computer program 512 includes machine-readable instructions capable for providing data channel virtualization in the computing system 500, according to the teachings and herein described embodiments of the present subject matter. In one embodiment, the computer program 512 is included on a compact disk-read only memory (CD-ROM) and loaded from the CD-ROM to a hard drive in the non-volatile memory 510. The machine-readable instructions cause the embedded system 502 to encode according to the various embodiments of the present subject matter.

As shown, the computer program 512 includes the DPM 102. For example, the DPM 102 can be in the form of instructions stored on a non-transitory computer-readable storage medium. The non-transitory computer-readable storage medium having the instructions that, when executed by the embedded system 502, causes the embedded system 502 to perform the method described in FIG. 4.

The above described architecture manages a DDC, such that more than one application can access the DDC without being aware of the presence of other applications while providing a same level of performance and flexibility of the use of the DDC when there is only a single application. Further, the above architecture provides a platform agnostic solution that is independent of any underlying platform. Furthermore, the above architecture facilitates sharing of device input/output (I/O) buffers across many applications while ensuring no access conflicts or deadlocks (buffer management). Also, the above architecture provides simulation of same/different virtual channel properties (VCPs) to multiple applications as required. Moreover, the above architecture maximizes buffer sharing and hence significantly reduces central processing unit (CPU) and memory utilization needed for the DDC management operation and further minimizes any resulting additions of processing latency during operation.

Also, the above architecture enables simultaneous usage of resources with significantly reduced processing overhead. The above architecture has provision for asymmetry in properties of data fed to different VDCs of a DPM. Each user can input independently different properties of media (for example, sampling rate, mono/stereo made for audio, resolution, frame rate for video and so on). The above technique also provisions for receiving data with asymmetric media properties from the VDCs of the DPM, i.e., each user can request different media properties independently. In addition, the above architecture has the ability to add/remove the VDCs based on need without affecting users of other VDCs. The above architecture provides scalability to add/remove any number of VDCs for each DDC. The above architecture provides ability to simulate different queue lengths for different channels. The buffer and buffer queue management of the above architecture allows multiple applications to access a same data source or resource, handling overrun and under-run conditions for queues as configured by the associated application. The above architecture also provisions to keep latency overheads to a minimum for delay sensitive applications. The buffer manager keeps track of the data buffers among how many applications it has been shared and when the application returns back those data buffers. Also, the above architecture provides a scheme to handle timing constraints for audio and video devices for virtual channels similar to a physical channel by providing blocking calls. The above technique enables multiple applications to co-exist in embedded media processors.

Although certain architecture, methods, systems, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A device policy manager (DPM) architecture for managing one or more devices in an embedded system, comprising:
   a component integration layer to provide platform agnostic access to one or more applications for accessing the one or more devices;
   a DPM controller to maintain mapping information between one or more virtual data channels (VDCs) associated with the one or more applications and one or more device data channels (DDCs) associated with the one or more devices; and
   one or more subsystems to manage interaction with the one or more DDCs associated with the one or more devices, wherein the component integration layer and the DPM controller are coupled to the one or more subsystems, and wherein each of the one or more subsystems comprises:
      an active thread module (ATM) coupled to the component integration layer, wherein the ATM to run its own thread, handle data exchange with an associated DDC and to perform data transformation that is common across the one or more VDCs;
      one or more virtual channel controllers (VCCs) to control data exchange between the ATM and the one or more applications and to perform independent data transformation for each of the one or more VDCs, wherein the VCCs are coupled to the component integration layer;
      a buffer manager module coupled to the ATM and the one or more VCCs, wherein the buffer manager module manages buffers across the ATM and the one or more VCCs and handles data exchange between the one or more DDCs and associated one or more VDCs using a data sharing and buffer marking, wherein the buffer manager module comprises:
         one or more buffer queues to provide a queued exchange of data between the one or more DDCs and the one or more VDCs, to provide ability to simulate different queue lengths for different channels, and to handle overrun and under-run conditions for the one or more buffer queues as configured by an associated application; and
         a buffer pool to identify free buffers in an associated subsystem; and
      a subsystem controller coupled to the ATM and the buffer manager module, wherein the subsystem controller controls the ATM, and the buffer manager module.

2. The DPM architecture of claim 1, wherein the DPM controller allows each of the one or more applications to configure virtual channel properties (VCPs) that define expected data input/output for the application on its VDC and further provides configurability to select each of the one or more VDCs to contribute to an eventual output of the DDC.

3. The DPM architecture of claim 1, wherein the DPM controller is to update the mapping information dynamically upon addition or deletion of a VDC, and wherein the component integration layer is to provide the platform agnostic access to the one or more devices via the associated one or more DDCs.

4. The DPM architecture of claim 3, wherein the one or more devices include input only devices, output only devices and input/output devices.

5. The DPM architecture of claim 3, wherein the DPM controller routes data associated with the one or more VDCs to an associated one of the one or more subsystems based on the mapping information.

6. The DPM architecture of claim 1, wherein the data transformation performed by the ATM, one or more VCCs and buffer manager module includes the data sharing, space/time division multiplexing and space/time division de-multiplexing.

7. The architecture of claim 1, wherein the one or more buffer queues corresponds to the one or more applications, wherein a number of slots in each of the one or more buffer queues is configurable by each of the one or more applications.

8. The DPM architecture of claim 1, wherein the data exchange between the one or more DDCs and associated one or more VDCs is handled using the data sharing by pushing the buffers onto the one or more buffer queues of an associated VDC for the data exchange.

9. The DPM architecture of claim 1, wherein the data exchange between the one or more DDCs and associated one or more VDCs is handled using the buffer marking by pushing the buffers onto the one or more buffer queues of an associated VDC by marking data location in the buffers.

10. A method for managing one or more devices in an embedded system using a device policy manager (DPM) architecture, comprising:
   initializing a device policy manager (DPM) by creating an instance of the DPM before creating any application, comprising:
      creating a component integration layer to provide platform agnostic access to one or more applications for accessing the one or more devices;
      creating a DPM controller to maintain mapping information between one or more virtual data channels (VDCs) associated with the one or more applications and one or more device data channels (DDCs) associated with the one or more devices; and
   creating one or more subsystems to manage interaction with the one or more DDCs associated with the one or more devices, wherein the component integration layer and the DPM controller are coupled to the one or more subsystems, and wherein creating each of the one or more subsystems comprises:
      creating an active thread module (ATM) to run its own thread, handle data exchange with an associated DDC, and perform data transformation that is common across the one or more VDCs, wherein the ATM is coupled to the component integration layer; and
      creating one or more virtual channel controllers (VCCs) to control data exchange between the ATM and the one or more applications and performs independent data transformation for each of the one or more VDCs, wherein the VCCs are coupled to the component integration layer;

creating a buffer manager module to manage buffers across the ATM and the one or more VCCs and handle data exchange between the one or more DDCs and associated one or more VDCs using a data sharing and buffer marking, wherein the buffer manager module is coupled to the ATM and the one or more VCCs, wherein creating the buffer manager module comprises:

creating one or more buffer queues to provide a queued exchange of data between the one or more DDCs and the one or more VDCs, to provide ability to simulate different queue lengths for different channels, and to handle overrun and under-run conditions for the one or more buffer queues as configured by an associated application; and creating a buffer pool to identify free buffers in an associated subsystem; and creating a subsystem controller to control the ATM and the buffer manager module, wherein the subsystem controller is coupled to the ATM and the buffer manager module.

11. The method of claim 10, further comprising:
updating the mapping information dynamically upon addition or deletion of a VDC by the DPM controller, wherein the component integration layer is created for providing platform agnostic access to the one or more devices via the associated one or more DDCs.

12. The method of claim 10, further comprising:
forming a mapping table including each of the one or more VDCs and its associated subsystem by the DPM controller, wherein an associated one of the subsystems is assigned, by the DPM controller, upon receiving a data channel request on the one or more VDCs from one of the one or more applications.

13. The method of claim 10, wherein handling data exchange between the one or more DDCs and associated one or more VDCs using the data sharing comprises:
handling the data exchange between the one or more DDCs and associated one or more VDCs by pushing the buffers onto the one or more buffer queues of an associated VDC for the data exchange.

14. The method of claim 10, wherein handling data exchange between the one or more DDCs and associated one or more VDCs using the buffer marking comprises:
handling the data exchange between the one or more DDCs and associated one or more VDCs by pushing the buffers onto the one or more buffer queues of an associated VDC by marking data location in the buffers.

15. An embedded system, comprising:
a processor communicatively coupled to one or more devices and one or more applications programs; and
memory operatively coupled to the processor, wherein the memory having disposed in it a device policy manager (DPM) architecture that is capable of managing one or more devices in the embedded system, wherein the DPM architecture comprises:
a component integration layer to provide platform agnostic access to one or more applications for accessing the one or more devices;
a DPM controller to maintain mapping information between one or more virtual data channels (VDCs) associated with the one or more applications and one or more device data channels (DDCs) associated with the one or more devices; and
one or more subsystems to manage interaction with the one or more DDCs associated with the one or more devices, wherein the component integration layer and the DPM controller are coupled to the one or more subsystems, and wherein each of the one or more subsystems comprises:
an active thread module (ATM) coupled to the component integration layer, wherein the ATM to runs its own thread and handle data exchange with an associated DDC and to perform data transformation that is common across the one or more VDCs;
one or more virtual channel controllers (VCCs) to control data exchange between the ATM and the one or more applications and to perform independent data transformation for each of the one or more VDCs, wherein the VCCs are coupled to the component integration layer;
a buffer manager module coupled to the ATM and the one or more VCCs, wherein the buffer manager module manages buffers across the ATM and the one or more VCCs and handles data exchange between the one or more DDCs and associated one or more VDCs using a data sharing and buffer marking, wherein the buffer manager module comprises:
one or more buffer queues to provide a queued exchange of data between the one or more DDCs and the one or more VDCs, to provide ability to simulate different queue lengths for different channels, and to handle overrun and under-run conditions for the one or more buffer queues as configured by an associated application; and
a buffer pool to identify free buffers in an associated subsystem; and
a subsystem controller coupled to the ATM and the buffer manager module, wherein the subsystem controller controls the ATM, and the buffer manager module.

16. The embedded system of claim 15, wherein the DPM architecture allows each of the one or more applications to configure virtual channel properties (VCPs) that define expected data input/output for the application on its VDC and further provides configurability to select each of the one or more VDCs to contribute to an eventual output of the DDC.

17. The embedded system of claim 15, wherein the DPM controller is to update the mapping information dynamically upon addition or deletion of a VDC, and wherein the component integration layer is to provide the platform agnostic access to the one or more devices via the associated one or more DDCs.

18. The system of claim 17, wherein the one or more devices include input only devices, output only devices and input/output devices.

19. The embedded system of claim 17, wherein the DPM controller routes data associated with the one or more VDCs to an associated one of the one or more subsystems based on the mapping information.

20. The embedded system of claim 15, wherein the data transformation performed by the ATM, one or more VCCs and buffer manager module includes data sharing, space/time division multiplexing and space/time division de-multiplexing.

21. The embedded system of claim 15, wherein the one or more buffer queues corresponds to the one or more applications, wherein a number of slots in each of the one or more buffer queues is configurable by each of the one or more applications.

22. A non-transitory computer-readable storage medium having instructions that, when executed by a computing device, cause the computing device to:
initialize a device policy manager (DPM) by creating an instance of the DPM before creating any application, comprising:
  creating a component integration layer to provide platform agnostic access to one or more applications for accessing the one or more devices;
  creating a DPM controller to maintain mapping information between one or more virtual data channels (VDCs) associated with the one or more applications and one or more device data channels (DDCs) associated with the one or more devices; and
  creating one or more subsystems to manage interaction with the one or more DDCs associated with the one or more devices, wherein the component integration layer and the DPM controller are coupled to the one or more subsystems, and wherein creating each of the one or more subsystems comprises:
    creating an active thread module (ATM) to run its own thread, handle data exchange with an associated DDC, and perform data transformation that is common across the one or more VDCs, wherein the ATM is coupled to the component integration layer; and
    creating one or more virtual channel controllers (VCCs) to control data exchange between the ATM and the one or more applications and performs independent data transformation for each of the one or more VDCs, wherein the VCCs are coupled to the component integration layer;
    creating a buffer manager module to manage buffers across the ATM and the one or more VCCs and handle data exchange between the one or more DDCs and associated one or more VDCs using a data sharing and buffer marking, wherein the buffer manager module is coupled to the ATM and the one or more VCCs, and wherein creating the buffer manager module comprises:
      creating one or more buffer queues to provide a queued exchange of data between the one or more DDCs and the one or more VDCs, to provide ability to simulate different queue lengths for different channels, and to handle overrun and under-run conditions for the one or more buffer queues as configured by an associated application; and
      creating a buffer pool to identify free buffers in an associated subsystem; and
      creating a subsystem controller to control the ATM and the buffer manager module, wherein the subsystem controller is coupled to the ATM and the buffer manager module.

23. The non-transitory computer-readable storage medium of claim 22, wherein the instructions cause the computing device to:
update the mapping information dynamically upon addition or deletion of a VDC by the DPM controller, and wherein the component integration layer is created for providing platform agnostic access to the one or more devices via the associated one or more DDCs.

* * * * *